US012265843B2

United States Patent
Lemoine et al.

(10) Patent No.: US 12,265,843 B2
(45) Date of Patent: Apr. 1, 2025

(54) METHOD AND DEVICE FOR MIGRATING A VIRTUALIZED FUNCTION IN THE EVENT OF A FAILURE IN THE TECHNICAL SERVER ENVIRONMENT

(71) Applicant: Orange, Issy-les-Moulineaux (FR)

(72) Inventors: Benoit Lemoine, Chatillon (FR); Jean-François Boussardon, Chatillon (FR); Anca Niculescu, Chatillon (FR); Joël Penhoat, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 657 days.

(21) Appl. No.: 17/602,567

(22) PCT Filed: Apr. 3, 2020

(86) PCT No.: PCT/EP2020/059539
§ 371 (c)(1),
(2) Date: Oct. 8, 2021

(87) PCT Pub. No.: WO2020/207914
PCT Pub. Date: Oct. 15, 2020

(65) Prior Publication Data
US 2022/0179685 A1   Jun. 9, 2022

(30) Foreign Application Priority Data

Apr. 8, 2019   (FR) ........................... 1903717

(51) Int. Cl.
*G06F 9/455*   (2018.01)
*G06F 9/48*   (2006.01)

(52) U.S. Cl.
CPC ........ *G06F 9/4856* (2013.01); *G06F 9/45558* (2013.01); *G06F 2009/4557* (2013.01)

(58) Field of Classification Search
CPC .................................................... G06F 9/4856
(Continued)

(56) References Cited

U.S. PATENT DOCUMENTS 8,341,626 B1 * 12/2012 Gardner ................ G06F 9/4856
                                                               718/1
9,645,899 B1 *  5/2017 Felstaine ............. G06F 11/2035
(Continued)

OTHER PUBLICATIONS

ETSI Group Specification, "Network Functions Virtualisation (NFV) Release 3; Management and Orchestration; Or-Vi reference point—Interface and Information Model Specification", ETSI GS NFV-IFA 005 V3.1.1 (Aug. 2018).

(Continued)

*Primary Examiner* — Mehran Kamran
(74) *Attorney, Agent, or Firm* — David D. Brush; Westman, Champlin & Koehler, P.A.

(57) ABSTRACT

A method for migrating a virtualised function from a first server to a second server depending on data of technical environment parameters. The interfaces specified in the virtualised architectures effectively make it possible to deploy and manage virtualised functions with a view to implementing a service but these interfaces do not contain information relating to the data relating to the technical environment upon which the servers, the virtualised functions and subsequently the services and applications that rely on the virtualised functions are dependent. The migration method proposes virtualised architectures that take into consideration the technical environment parameters in order to move virtualised functions whose functioning could be impacted by a malfunction of one or more technical environment parameter(s).

16 Claims, 4 Drawing Sheets

Figure 1:
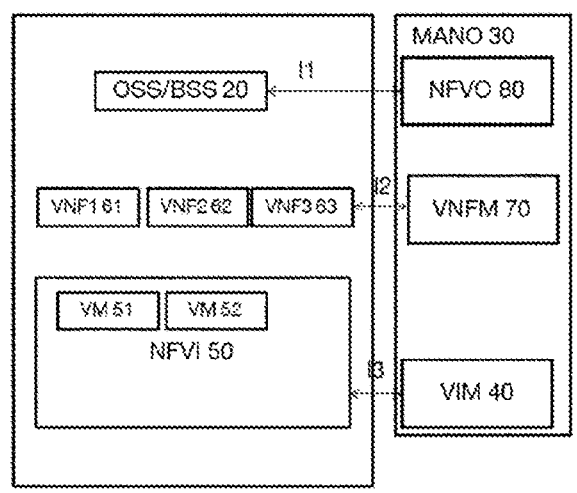

(58) Field of Classification Search
USPC .......................................................... 718/1
See application file for complete search history.

(56) References Cited

U.S. PATENT DOCUMENTS

| | | | | |
|---|---|---|---|---|
| 9,882,828 | B1* | 1/2018 | Sandlerman | H04L 47/74 |
| 10,193,768 | B2* | 1/2019 | Chawki | H04L 41/122 |
| 10,291,543 | B1* | 5/2019 | Felstaine | H04L 41/082 |
| 10,606,718 | B1* | 3/2020 | Sandlerman | G06F 11/20 |
| 10,812,511 | B2* | 10/2020 | Bihannic | H04L 63/1425 |
| 11,320,797 | B2* | 5/2022 | Nixon | G06F 11/203 |
| 11,474,918 | B1* | 10/2022 | Sandlerman | G06F 11/1484 |
| 11,922,224 | B2* | 3/2024 | Slim | H04L 41/0895 |
| 2006/0106931 | A1* | 5/2006 | Richoux | G06F 9/4881 |
| | | | | 709/227 |
| 2013/0346973 | A1* | 12/2013 | Oda | G06F 9/4856 |
| | | | | 718/1 |
| 2015/0052282 | A1* | 2/2015 | Dong | H04L 49/70 |
| | | | | 710/316 |
| 2015/0160972 | A1* | 6/2015 | Yu | G06F 9/4856 |
| | | | | 718/1 |
| 2015/0237066 | A1* | 8/2015 | Ponsford | H04L 63/1408 |
| | | | | 726/22 |
| 2016/0127495 | A1* | 5/2016 | Tasoulas | H04W 4/60 |
| | | | | 709/223 |
| 2016/0224409 | A1* | 8/2016 | Liu | H04L 67/10 |
| 2016/0234082 | A1* | 8/2016 | Xia | H04L 41/40 |
| 2016/0266919 | A1* | 9/2016 | Wang | G06F 9/45558 |
| 2017/0075732 | A1* | 3/2017 | Itoh | H04L 67/1004 |
| 2017/0086111 | A1* | 3/2017 | Vrzic | H04W 36/023 |
| 2017/0214608 | A1* | 7/2017 | Jilani | H04L 45/586 |
| 2017/0237647 | A1* | 8/2017 | N | H04L 41/0894 |
| | | | | 709/224 |
| 2017/0238171 | A1* | 8/2017 | Huang | H04L 41/0897 |
| | | | | 455/424 |
| 2017/0250870 | A1* | 8/2017 | Zhao | H04L 63/20 |
| 2018/0052701 | A1* | 2/2018 | Kaplan | G06F 9/45558 |
| 2018/0191838 | A1* | 7/2018 | Friedman | H04L 41/0895 |
| 2019/0132211 | A1* | 5/2019 | Yeung | H04L 67/10 |
| 2019/0199638 | A1* | 6/2019 | Ceccarelli | H04L 47/125 |
| 2019/0200400 | A1* | 6/2019 | Liu | H04L 41/0897 |
| 2019/0286475 | A1* | 9/2019 | Mani | G06F 9/45558 |
| 2019/0349258 | A1* | 11/2019 | Xia | H04L 41/0893 |
| 2020/0174845 | A1* | 6/2020 | Toeroe | G06F 8/65 |
| 2020/0259719 | A1* | 8/2020 | Ni | H04L 41/0895 |
| 2020/0278893 | A1* | 9/2020 | Niell | G06F 9/4856 |
| 2020/0401432 | A1* | 12/2020 | Nakano | G06F 9/5044 |
| 2021/0056485 | A1* | 2/2021 | Raveendran | G06Q 10/06315 |
| 2021/0133004 | A1* | 5/2021 | Slim | H04L 43/0852 |
| 2022/0174588 | A1* | 6/2022 | Fieau | H04W 24/08 |
| 2022/0179685 | A1* | 6/2022 | Lemoine | G06F 9/4856 |
| 2023/0008683 | A1* | 1/2023 | Hjelm | H04L 41/0823 |

OTHER PUBLICATIONS

ETSI Group Specification, "Network Functions Virtualisation (NFV) Release 2; Management and Orchestration; Vi-Vnfm reference point—Interface and Information Model Specification", ETSI GS NFV-IFA 006 V2.4.1 (Feb. 2018).

ETSI Group Specification, "Network Functions Virtualisation (NFV); Reliability; Report on Models and Features for End-to-End Reliability", ETSI GS NFV-REL 003 V1.1.1 (Apr. 2016).

International Search Report dated Jul. 15, 2020 for corresponding International Application No. PCT/EP2020/059539, Apr. 3, 2020.

Written Opinion of the International Searching Authority dated Jul. 24, 2020 for corresponding International Application No. PCT/EP2020/059539, filed Apr. 3, 2020.

* cited by examiner

METHOD AND DEVICE FOR MIGRATING A VIRTUALIZED FUNCTION IN THE EVENT OF A FAILURE IN THE TECHNICAL SERVER ENVIRONMENT

CROSS-REFERENCE TO RELATED APPLICATIONS

This Application is a Section 371 National Stage Application of International Application No. PCT/EP2020/059539, filed Apr. 3, 2020, the content of which is incorporated herein by reference in its entirety, and published as WO 2020/207914 on Oct. 15, 2020, not in English.

1. TECHNICAL FIELD

The invention relates to communications networks, in particular offering services implemented based on virtualized functions within a data center. The invention more specifically aims to improve the availability of communications services implemented based on virtualized functions as well as the robustness of communications networks by using data from the technical environment.

2. PRIOR ART

The telecommunications sector is at the heart of a digital transformation that relies on emerging technologies such as the virtualization of network functions (or VNF—Virtual Network Functions) consisting in decoupling the network functions from the physical equipments that support them in order to deploy them in generic servers installed in data centers, or clouds, which are distributed to a greater or lesser extent. For example, the data of an application used by clients, which used to transit through and be processed by physical equipments such as BTS (Base Transceiver Station) stations, NodeBs, BNG (Broadband Network Gateway) access equipments, PGWs (Packet Data Network Gateways), routers, DPI (Deep Packet Inspection) equipments, firewalls, application functions, transit through and are processed by VNFs deployed in generic servers.

These virtualized functions are deployed on generic servers using for example virtual machines so as to dispense with dedicated hardware and facilitate the deployment of new virtualized functions, while at the same time controlling costs.

Virtualized functions may be deployed on servers in larger or smaller and more or less centralized data centers. Some virtualized functions, processing data requiring low latency, tend more to be deployed at the edge of the communications network, that is to say as close as possible to the terminals accessing the services relying on the virtualized functions, while virtualized functions processing data with less stringent latency requirements are rather deployed in centralized data centers, which are generally of larger size. The MEC (Mobile Edge Computing) initiative, consisting in deploying application functions of a communications network at the edge of a network, these functions being able to be virtualized, is one example of the deployment of VNFs at the edge of a communications network.

Deploying virtualized functions in data centers, be these centralized or distributed, requires computing, storage, memory, network and energy resources. The correct operation of the virtualized functions requires the storage, computing, memory, network and energy resources to be operational and be able to process the virtualized functions.

[FIG. 1] shows a simplified view of a communication architecture according to the prior art.

The communication architecture according to [FIG. 1] allows virtualized functions VNF1 61, VNF2 62 and VNF3 63 to be deployed on an architecture, or infrastructure, NFVI 50. This infrastructure NFVI 50 may be implemented in centralized data centers (or clouds), that is to say in the core network, or else distributed, closer to clients. This infrastructure NFVI 50 consists of servers, such as virtual machines VM 51, VM 52 on which the abovementioned virtualized functions are installed. The infrastructure NFVI 50 furthermore comprises computing and storage resources, these resources being managed by a virtualization layer such as a hypervisor, as well as network resources that are not shown in [FIG. 1]. The communication architecture furthermore comprises an operation and service management entity OSS/BSS 20.

The management of the virtualized functions, and in particular their installation and the monitoring of their operation as well as their movement, where applicable, is managed by a MANO (Management and Orchestration) entity 30 that comprises an orchestration entity NFVO 80 managing the network services created based on virtualized functions using the interface I1, a VNFM (Virtual Network Function Manager) entity 70 managing the various virtualized functions VNF1 61, VNF2 62, VNF3 63 using the interface 12, as well as a VIM (Virtualized Infrastructure Manager) entity 40 managing the resources of the infrastructure NFVI 50 using the interface 13. According to the prior art, depending on service requirements, the features of the virtualized functions and the resources of the infrastructure in terms of memory, computing and network capacity resources, the virtualized functions are instantiated, moved from one virtual machine to another or from one data center to another, or even uninstalled.

The placement of virtualized functions and their management, in terms of computing, storage, memory and network resources, are taken into account in the techniques from the prior art, in particular in document ETSI GS NFV-IFA 005 V3.1.1 (2018-08), which describes the interfaces and information models relating to the Or-Vi and Vi-Vnfm interfaces of a virtualized architecture as described by ETSI-NFV-MANO (Management and Orchestration). The Or-Vi interface between a VIM (Virtualized Infrastructure Manager) entity responsible for managing virtualized resources and an NFVO (Network Function Virtualization Orchestrator) entity responsible for resource management in the provision of a service. The Or-Vi interface allows the NFVO entity to request resources from the VIM entity in order to deploy virtualized functions requiring these resources to be managed within a physical NFVI (NFV Infrastructure) infrastructure. The Vi-Vnfm interface conveys the data exchanged between a VIM entity and a VNFM (Virtualized Network Function Manager) entity responsible for managing the life cycle of the virtualized functions (VNF). It in particular allows the VNFM to ask the VIM entity to deploy a VNF instance on the resources reserved by the NFVO for the VNF in the NFVI infrastructure. Document ETSI GS NFV-IFA 006 V2.4.1 (2018-02) describes the various information exchanged over the Vi-Vnfm interface.

In the event of failure or maintenance of computing, storage, memory or network resources, resilience mechanisms allow the virtualized functions to migrate the impacted services to other resources not impacted by the failure or maintenance. Document ETSI GS NFV-REL 003 V1.1.1 (2016-04) describes a certain number of these resilience mechanisms that may be implemented in virtualized architectures. The placement and management of the virtualized functions by the VIM entity may be based on a correspondence table that indicates the servers or virtual machines (such as VMs) on which the various virtualized functions (VNFs) are deployed. When the VIM entity receives a deployment request for a virtualized function, it reserves the resources required there by selecting a server there having enough computing, storage, memory and network resources to allow the virtualized function to be deployed there. When the VIM entity receives a request to delete a virtualized function on a server, it performs the deletion and updates the correspondence table accordingly.

Although the placement and management of the virtualized functions for implementing a service take into account the computing, memory, storage and network resources of the servers on which virtualized functions are deployed, the resources provided by the technical environment of the data centers, and used by the servers, are not taken into account in the techniques in relation to the prior art.

Figure 2:
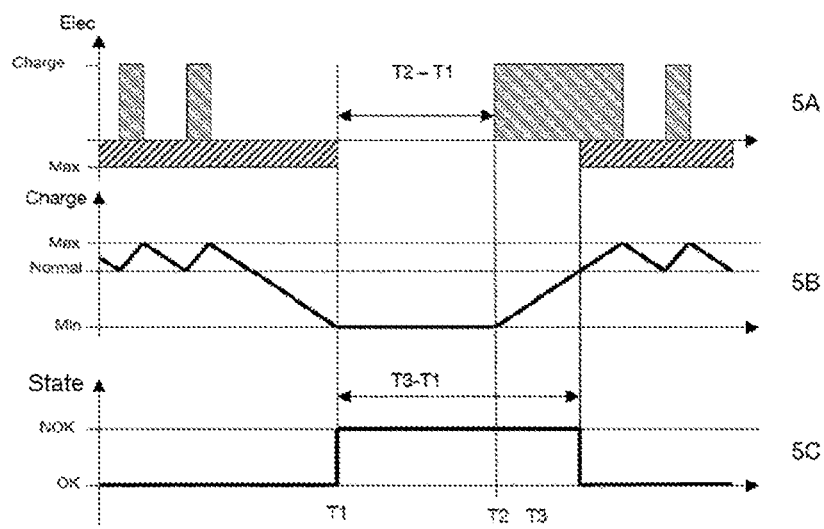

[FIG. 2] shows a temporal description of the events taking place in a communications architecture according to the prior art.

[FIG. 2] relates to a parameter linked to the supply of electric power to a server and shows three curves 5A, 5B, 5C. The electric charge of a server (curve 5B), or of a set of servers, during nominal operation changes between the values Max and Normal. When the charge reaches the level Normal, the electric power supply is activated so as to be recharged, as indicated on the curve 5A, so as to reach the level Max. The supply of electric power may be provided by batteries or a generator set, or even by a mains electric power supply. If a problem occurs in the electric power supply parameter, the electric charge drops below the level Normal; but this time the charging of the electric power supply is not activated so as to be increased due to the problem, and it continues to drop until reaching a level Min. In this case, the electrical parameter (State—curve 5C) changes from OK mode to NOK mode at the time T1, and the server whose electrical parameter is defective is no longer available following this change of state. The virtualized functions installed on the server whose parameter is shown on the curve 5C are then no longer available either. At the time T2, the charging resumes (curve 5A), and when the charge reaches a level sufficient to operate the server, at the time T3, the state of the electrical parameter of the technical environment changes from NOK mode to OK mode, and the server becomes available again, as do the virtualized functions installed on the server. The downtime of the server and of the virtualized functions, according to the prior art, corresponds to the period (T3-T1), while the period for recovery from the electric power supply fault, corresponding to resumption of the charging of the electric power supply of the server, corresponds to the period (T2-T1). The electric power supply problem may therefore cause unavailability of the virtualized functions and therefore of the services using these virtualized functions for a relatively long duration, represented here by the period (T3-T1). Upon an event regarding a technical parameter, such as the supply of electric power to a server, the water level in a data center, detection of intrusion into the data center, or abnormal heating of a server, the virtualized functions, according to the prior art, present on the servers may be impacted, and the services relying on these virtualized functions may be degraded. The interfaces specified in virtualized architectures thus effectively make provision to be able to deploy and manage virtualized functions with a view to implementing a service, but these interfaces do not incorporate information relating to resources relating to the technical environment (such as electric power supply, air conditioning, flooding, intrusion, gas leakage) on which the servers, the virtualized functions and therefore the services and applications relying on the virtualized functions depend.

The present invention aims to provide improvements with respect to the prior art.

3. DISCLOSURE OF THE INVENTION

The invention aims to improve the situation by way of a method for migrating a virtualized function installed on a first server in a data center of a communication architecture, implemented in an administration entity for administering said first server, said entity being able to transmit, to a management entity for managing the virtualized function, data relating to the installation of the virtualized function, the method comprising at least receiving a notification message comprising at least one item of data of a technical environment parameter relating to the first server, determining an action to safeguard the virtualized function if the at least one item of data crosses a predefined threshold, and sending, to the management entity, a message to migrate the virtualized function to a second server.

The migration method makes it possible to ensure that a virtualized function is able to remain operational in case of an event linked to the technical environment of the server. A server installed in a data center may specifically suffer damage or malfunctions due to incidents regarding the supply of electric power to the server and/or the data center, regarding the cooling of the server, regarding damage caused for example by a flood, regarding an intrusion into a data center, and the method makes it possible to take these parameters into account in addition to the parameters in relation to the prior art (storage resources, computing resources, memory resources and network resources of the server) in order to install or move a virtualized function. The item of data of a technical environment parameter may thus be an electric power, a state of unavailability, a water level, or triggering of a sensor in the event of intrusion. The migration method thus makes it possible to keep a virtualized function in a working state and therefore to guarantee that the service based on the virtualized function remains available. Furthermore, in the event of interruption of the virtualized function, and therefore potentially also the one or more services using the virtualized function, being required, then this interruption time is reduced by migrating the virtualized function before the server is completely out of service by defining an appropriate threshold. The method furthermore makes it possible to limit the impact of a problem arising from the technical environment on a data center by limiting the resource requirements in relation to the energy of the servers by migrating the virtualized functions installed on these servers.

According to one aspect of the invention, in the migration method, the at least one item of data of a parameter of the technical environment relates to the supply of electric power to the server.

In the case in particular where the data center does not have a continuous power supply or if the continuous supply of power to the server is defective and backed up by batteries, the method may advantageously be implemented so as to regularly notify the administration entity about the electric power able to be supplied to the server by the electric power supply device and, in the event that this electric power falls below a predefined threshold equivalent to the minimum power required by the server, the administration entity may automatically decide to move the virtualized functions located on the server. The transmitted item of data may also be a state of unavailability of a server.

According to another aspect of the invention, in the migration method, the at least one item of data of a technical environment parameter relates to the cooling of the server.

Cooling servers in data centers is one of the most important priorities for ensuring optimum operation of the servers. Taking into account the calorie extraction capability parameter through notification messages makes it possible to ensure that cooling is provided and that the servers hosting virtualized functions will not fail. In the event that the calorie extraction capability drops below a predefined threshold equivalent to the minimum heat dissipation of the server, the virtualized functions should be migrated to another server. This is also the case when the item of data corresponds to a fault state of the air conditioning system.

According to another aspect of the invention, in the migration method, the at least one item of data of a technical environment parameter relates to a water level in the room where the server is located.

Data centers may suffer damage such as water intrusions. It is therefore necessary to check that the drainage pumps operate well enough to prevent the water level from rising, which could damage a server. The information about the water level in relation to the position of a server makes it possible to prevent unavailability of virtualized functions installed on the server by preventively migrating them before the water level damages the server.

According to another aspect of the invention, in the migration method, determining a safeguarding action comprises triggering a migration deadline.

Depending on the received parameters of the technical environment and the evolution of these parameters, the administration entity may estimate a duration for which a server continues to be operational before failing. This duration may for example be calculated based on received parameter data, the predefined threshold and inherent operating features of a server. This duration may be used to implement an emergency migration, or a migration more spread over time, of virtualized functions.

According to another aspect of the invention, in the migration method, the migration message comprises a migration duration to be complied with.

The migration message sent to the management entity may advantageously comprise a duration allowing the entity to estimate the criticality of the migration and to migrate the virtualized functions urgently or else over a longer period. This migration duration allows the management entity to be able to schedule its migration work for the virtualized functions. The migration duration may also depend on the features of the virtualized function, in particular so as to ensure that a virtualized function important for the provision of a service is migrated as a priority.

According to another aspect of the invention, in the migration method, the migration message comprises identification information relating to the virtualized function.

A single server may host multiple separate virtualized functions. Some of these functions may be necessary to implement a service, and others may be optional. Sending, to the management entity, a migration message comprising identification information relating to the virtualized function allows the management entity to migrate the functions for which identification information is transmitted, thus reducing the number of migrations to be performed or to be prioritized, which may be important in the event of a crisis or important event, or else if the number of host servers is limited.

According to another aspect of the invention, the migration method furthermore comprises receiving, from the management entity, an information message comprising an identifier of the second server to which the virtualized function has been migrated.

The administration entity should ensure that it is notified of the technical environment parameters of the servers on which virtualized functions are installed. To this end, the administration entity may maintain a correspondence table indicating the servers on which the various virtualized functions are installed. When a modification occurs in the table, for example following the migration method, the administration entity should notify the entity sending it the notification messages that it wishes to receive the technical environment parameters of the second server. According to another aspect of the invention, in the migration method, the second server is selected on the basis of its location in the communication architecture. Technical environment parameters may impact multiple servers in parallel, in particular if an event impacts all of the servers in a data center. The administration entity, for example by correlating the various received notification messages, and/or the various data relating to technical environment parameters, may identify a problem in a data center and therefore select the second server in a data center not impacted by the event so as to improve the resilience of the service based on the migrated virtualized functions.

According to another aspect of the invention, the migration method furthermore comprises removing the first server from a list of servers able to host a virtualized function following the reception of the notification message.

In order to avoid new virtualized functions being instantiated on the server impacted by a problem regarding one parameter or multiple parameters of the technical environment, the server is marked in the correspondence table as no longer able to receive a new virtual function.

According to another aspect of the invention, the migration method furthermore comprises shutting down the first server following the transmission of the migration message to the management entity.

The server threatened by the lack of electric power supply or by degraded environmental conditions, since it is possibly relieved of the various virtualized functions that it was hosting, may be shut down. As a result, it no longer consumes any electrical energy, meaning that the other equipments in the data center that are still active are able to benefit from electrical energy from the battery for a longer duration, in the event that the electrical environment parameter is electrical. Likewise, it no longer dissipates any heat, meaning that the temperature of the other equipments in the data center increases less quickly, and these equipments may have additional time before in turn being impacted by an excessive temperature. Finally, if the electrical circuit supplying power to the shut-down server was the one most exposed to rising water, it will not generate a short circuit able to be detected by the upstream electrical protection unit and risking disconnecting the supply of electric power to the other equipments in the data center in which it is located.

The various aspects of the migration method that have just been described may be implemented independently of one another or in combination with one another.

The invention also relates to a device for migrating a virtualized function installed on a first server in a data center of a communication architecture, implemented in an administration entity for administering said first server, said entity being able to transmit, to a management entity for managing the virtualized function, data relating to the installation of the virtualized function, the device comprising

- a receiver, able to receive at least one notification message comprising at least one item of data of a technical environment parameter relating to the first server,
- a determination module, able to determine an action to safeguard the virtualized function if the at least one item of data crosses a predefined threshold,
- a transmitter, able to transmit, to the management entity, a message to migrate the virtualized function to a second server.

This device, which is able, in all of its embodiments, to implement the migration method that has just been described, is intended to be implemented in a management entity for managing a communications infrastructure, such as a virtualized infrastructure. For example, the device may be implemented in a VIM entity.

The invention also relates to a system for migrating a virtualized function installed on a first server in a data center of a communication architecture comprising

- an administration entity for administering the first server, comprising a migration device,
- a management entity for managing the virtualized function, comprising a receiver able to receive, from the administration entity, a message to migrate the virtualized function to a second server.

The invention also relates to a computer program comprising instructions for implementing the steps of the migration method that has just been described when this program is executed by a processor and to a recording medium able to be read by a determination device and on which the computer program is recorded.

This program may use any programming language, and be in the form of source code, object code, or of intermediate code between source code and object code, such as in a partially compiled form, or in any other desirable form.

The invention also targets a computer-readable information medium comprising instructions of the computer programs as mentioned above.

The information medium may be any entity or device capable of storing the program.

For example, the medium may comprise a storage means, such as a ROM, for example a CD-ROM or a microelectronic circuit ROM, or else a magnetic recording means, for example on a hard disk.

Moreover, the information medium may be a transmissible medium such as an electrical or optical signal, which may be routed via an electrical or optical cable, by radio or by other means. The program according to the invention may in particular be downloaded from an Internet network.

Alternatively, the information medium may be an integrated circuit in which the programs are incorporated, the circuit being designed to execute or to be used in the execution of the methods in question.

4. BRIEF DESCRIPTION OF THE DRAWINGS

FIG. 1 and FIG. 2 respectively show an architecture and a temporal description of the events in relation to the prior art, described in section 2.

Figure 3:
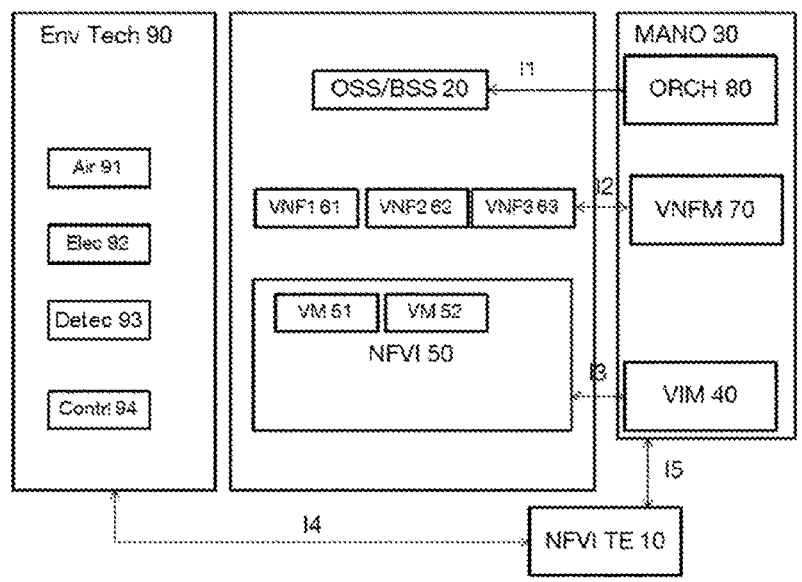
Figure 4:
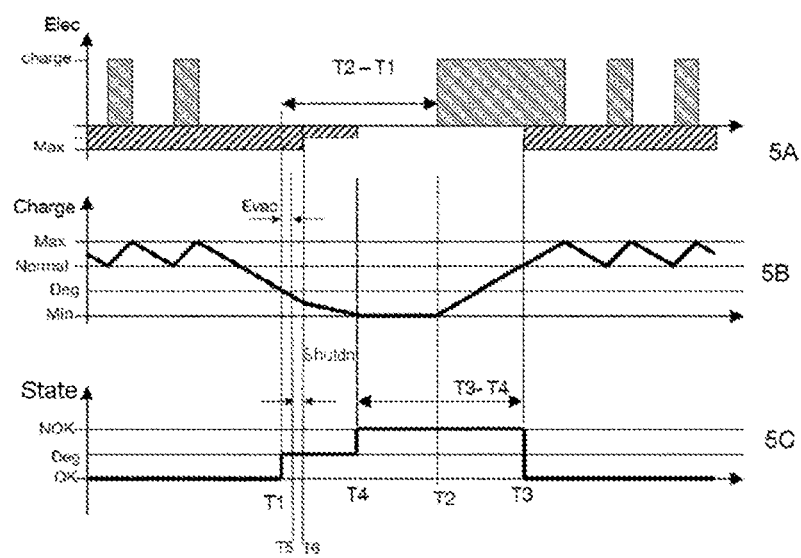
Figure 5:
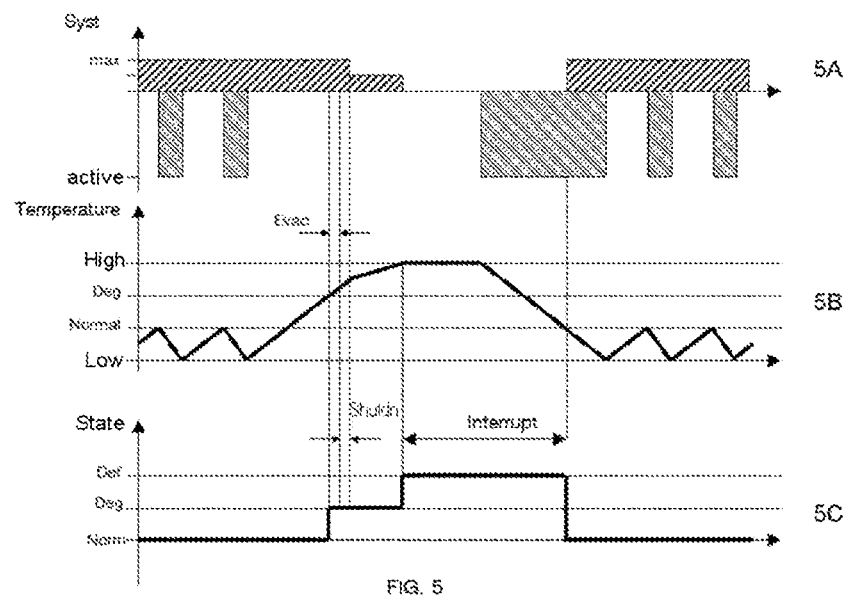
Figure 6:
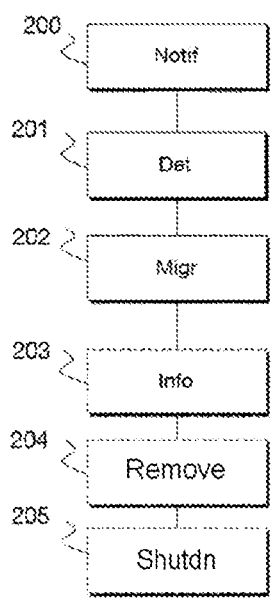
Figure 7:
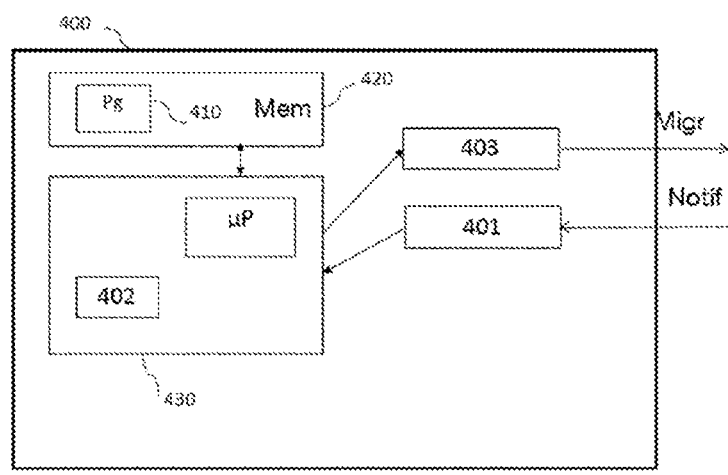

Other features and advantages of the invention will become more clearly apparent upon reading the following description of particular embodiments, provided by way of simple illustrative and nonlimiting examples, and the appended drawings, in which:

FIG. 3 shows a simplified view of a communication architecture according to a first aspect of the invention, FIG. 4 shows a temporal description of the steps of the migration method according to one embodiment of the invention, FIG. 5 shows a temporal description of the steps of the migration method according to another embodiment of the invention, FIG. 6 shows steps for implementing the invention according to yet another embodiment of the invention, FIG. 7 shows one example of the structure of a migration device according to one aspect of the invention.

5. DESCRIPTION OF THE EMBODIMENTS

In the remainder of the description, embodiments of the invention are presented in a communication architecture in which virtualized functions are instantiated. This infrastructure may be implemented in order to route data to static or mobile terminals, and the invention may be intended to migrate virtualized functions used to route and/or process data from residential clients or businesses.

Reference is made to [FIG. 3], which shows a simplified view of a communication architecture according to a first aspect of the invention. The entities shown in [FIG. 1] are supplemented with new entities that make it possible to take into account the constraints linked to the technical environment in the management of the installation of virtualized functions VNF1 61, VNF2 62 and VNF3 63.

The parameter data of the technical environment Env Tech 90 make it possible to ensure optimum operation of the servers (or virtual machines) VM 51 and VM 52, so that the virtualized functions VNF1 61, VNF2 62 and VNF3 63 themselves operate in a nominal manner, and therefore that the services implemented based on these virtualized functions VNF1 61, VNF2 62 and VNF3 63 comply with a good quality of service. The technical environment parameters are for example the parameters Air 91 linked to the air conditioning and to the guarantee that the temperature of the servers VM 51 and VM 52 is within a given temperature range, the electrical parameters Elec 92, the detectors Detec 93 for monitoring the water level in data centers where the servers VM 51 and VM 52 are installed (risk of an electrical short-circuit), or else the mains gas concentration (risk of explosion) present in such data centers, or even intrusion into the premises (risk of server theft). This list of parameters is not exhaustive, and these parameters may be associated with one server from among the servers VM1 and VM2 in particular, or with a set of servers.

The technical environment Env Tech 90 also contains a controller Contrl 94 for managing the various technical parameters Air 91, Elec 92 and Detec 93. The data relating to these various parameters are communicated to an administration entity NFVI TE 10 for administering a server via an interface 14. This administration entity NFVI TE 10 communicates with the management entity VIM 40 via the interface I5. According to one example, the entity NFVI TE 10 is collocated with the entity VIM 40. In this case, the entity VIM 40 manages all of the parameters relating to the servers of the infrastructure NFVI 50, including the technical environment parameters Air 91, Elec 92 and Detec 93.

[FIG. 4] shows a description of the steps of the migration method according to one embodiment of the invention. This embodiment is implemented in the same context as that described for [FIG. 2]. The same types of curve are shown as in [FIG. 2] and are specific to one or more servers in one or more data centers. A first difference from [FIG. 2] consists in determining a new level Deg of charge and associated state on the curves 5B and 5C. Thus, when a problem occurs regarding the electric power supply, the electric charge of a server decreases from the level Max and the electrical problem leads to the electric charging of the server power supply not resuming when the level of charge reaches a level Normal. The charge therefore continues to decrease so as to reach a level Deg, for degraded, triggering an action to be performed. When the charge reaches this level (curve 5B and curve 5C), at the time T1, an evacuation action Evac is triggered between T1 and T5. This action consists for example in moving one or more virtualized functions present on the server whose state is provided on the curve 5C, so as to guarantee the correct operation of these virtualized functions.

The server is then in a degraded state Deg (curve 5C). According to one example, some functions of the server are deactivated and some or all of the virtualized functions on the server are migrated. Since the electric charge of the server (curve 5B) continues to decrease after the time T5, a shutdown action Shutdn for shutting down the server is implemented between T5 and T6. This shutdown action Shutdn, consisting for example in disconnecting the supply of electric power to the server, leads to the virtualized functions still present on the server being made inoperative and, in addition, to a reduction in the electric power consumption of a data center in which the server under consideration (or all of the servers under consideration) is or are located and therefore to the impact of the electric power supply problem on the data center being limited by reducing the electric power consumption through a drop in the power demand from the servers. According to one alternative, this operation may furthermore make it possible to maintain what are known as priority servers in the data center as a priority by reducing the overall electric power consumption by shutting down non-priority servers. At the time T4, the server becomes unavailable. At the time T2, the electric power supply problem is resolved (curve 5A) and the server acquires enough charge to be operational at the time T3, this corresponding to a normal level of charge Normal (curve 5B). The level of charge considered sufficient to host new virtualized functions depends on the virtualized functions to be installed and on the levels of charge considered sufficient to provide services based on the virtualized functions installed on the server.

The Degraded level Deg and the operations implemented on the server at the times T1, T5, T6 make it possible to guarantee the availability of the virtualized functions on the one or more impacted servers. They also make it possible to limit the impact of a problem on one or more servers by carrying out evacuation and possibly shutdown actions, thus reducing the need for an electric power supply in the data center where the one or more servers is or are installed, and making it possible to limit the impact of the problem and reducing the downtime to the period T3-T4 by virtue of the actions carried out preventively in relation to the time of total unavailability of the server (State NOK).

[FIG. 5] shows a temporal description of the steps of the migration method according to another embodiment of the invention. This embodiment relates to the temperature at which a server is kept so that it operates in an optimum manner, and therefore to the air conditioning system of the server or of the data center in which a server is located. This [FIG. 5] shows the three curves 5A, 5B and 5C. Curve 5A shows the activation of the cooling system, while curve 5B relates to the observed temperature of the server and curve 5C relates to the state of cooling of the server. In the operational operating state, the system switches to active mode (curve 5A) as soon as the temperature reaches a level Normal (curve 5B), and stays there until the temperature of the server reaches the level Low.

During these cyclic phases of putting the cooling system into operation (curve 5A), the temperature of the server oscillates during normal operation between the levels Low and Normal (curve 5B) and the state of the cooling system is normal (Norm-curve 5C). If a problem occurs regarding the cooling system for regulating the parameter Temperature of the technical environment, the temperature may move above the level Normal (curve 5B) because the system did not activate when the temperature level Normal was reached (curve 5A). The temperature of the server then reaches the level Deg (curve 5B) and an administration entity for administering one or more servers receives an item of data relating to the temperature, for example the parameter Deg (curve 5C). The administration entity then decides on an action to safeguard a virtualized function installed on the one or more impacted servers and then transmits a migration message Evac to an entity managing the virtualized function.

According to another example, the safeguarding action could also comprise duplicating the virtualized function on another server. The administration entity may furthermore transmit a migration duration to be complied with in the migration message transmitted to the management entity for managing the virtualized function. It is possible for a server to host multiple virtualized functions and for a migration action to be specific to one virtualized function, in which case it may be necessary, according to one alternative, to provide an identifier of the virtualized function to the management entity for managing the virtualized function, with, where appropriate, a migration duration specific to the virtualized function.

According to one alternative, the server experiencing a temperature problem may be shut down (Shutdn) so as not to exacerbate the temperature problem that may be being experienced by a data center in which the server is present. According to one alternative, the shutdown may consist only in stopping the operation of a virtual machine on a server. From the time when the temperature reaches the level Deg (curve 5B), the administration entity asks the management entity for managing the virtualized function to migrate the virtualized function. According to another alternative, the server is shut down by the administration entity for administering the server. If the temperature of the server continues to increase despite the operations carried out, the temperature reaches the level High (curve 5B) and the server is then in a defective state (Def-curve 5C) until the cooling system is restored and restarted (curve 5A). When the server is in a state Deg or Def, as the case may be, it is indicated, in the correspondence list of virtualized functions on the servers, as not being able to host any virtualized functions. After an operating period allowing the temperature Normal to be reached again (curve 5B), the server is no longer in a defective state (Def-curve 5C) and returns to a normal state (Norm-curve 5C). When no more degraded technical environment parameters justify shutting down the server, the server may be reactivated if it was shut down, and then marked in the correspondence list of virtualized functions on the various servers as being able to host new virtualized functions.

[FIG. 6] shows steps for implementing the invention according to yet another embodiment of the invention. In this embodiment, the parameter of the technical environment relates to a water level in the room where a computer server is installed. The technical environment parameter then corresponds to a water level beyond which an operation of safeguarding the virtualized functions located on the server should be implemented.

In a step 200, a water level detector of an entity in the technical environment of a server sends, to an administration entity for administering the server or an infrastructure comprising servers, a notification message Notif comprising an item of data of a parameter relating to the water level that could cause a malfunction of one or more servers. The item of data may be the water level, a state of the water level or any other item of data relating to the water level and allowing the administration entity to make a decision. This message may comprise a server identifier or an item of information, for example a data center identifier, allowing the administration entity for administering the one or more servers to identify the one or more servers impacted by the received item of data.

In step 201 Det, the administration entity for administering the one or more servers determines a safeguarding action on the basis of the item of data of the received parameter. If the received item of data indicates a water level that might damage the server, it decides on an action to migrate one or more virtualized functions installed on the server. The safeguarding action may, according to one alternative, also comprise an action of shutting down the server and possibly an action of informing other management entities, such as for example a service management entity, for example an NFVO, operated based on the virtualized function to be moved. The safeguarding action may also trigger a deadline or a duration to be complied with for the migration. This duration may for example depend on various received parameters (type of virtualized functions, received item of data of the parameter, types of servers, location of the server). The device may possibly hold a correspondence table comprising a list of the virtualized functions installed on the servers so as to draw the link between the server impacted by the received parameter and the migration actions to be implemented, or even the devices for managing virtualized functions to be called.

In step 202 Migr, the administration entity transmits, to a management entity for managing the virtualized function installed on a server impacted by the item of data of the received parameter, a message to migrate the virtualized function. This message may comprise a duration to be complied with in order to perform the migration, for example on the basis of the deadline determined in step 201. The message may also comprise an identifier of the virtualized function to be migrated, if for example the management entity manages multiple virtualized functions and if separate actions or durations have to be complied with to migrate the various virtualized functions managed by the management entity.

In step 203 Info, according to one alternative, the management entity for managing the virtualized function transmits, to the administration entity for administering the server, an information message indicating that the migration has been performed, as well as an identifier of a second server to which the virtualized function has been migrated. This information allows the administration entity in particular to update its correspondence table of virtualized functions installed on the servers, and also possibly to subscribe to a system for notifying data of technical environment parameters relating to the second server. The second server was possibly selected depending on its topological or geographical location, so as to avoid installing the virtualized function on a server that is possibly also impacted by the received item of technical parameter data.

In step 204 Remove, the administration entity may possibly perform an operation Remove in which the first server that has fallen victim to the incident relating to the technical parameter is removed from the correspondence table by the administration entity for being able to host a virtualized function. This removal may also be communicated to the management entities for managing the virtualized functions in order to prevent them from offering a migration to such servers during incidents related to the technical environment of an impacted server.

In step 205 Shutdn, the administration entity possibly performs an operation Shutdn to stop the server impacted by the item of data of the received technical parameter. This may involve shutting down a virtual machine, or a container, or even a server. This operation makes it possible to protect the shut-down entity, but also to allow a faster recovery time by avoiding untimely restarting of these servers when the system is restored or even also to protect other equipments potentially impacted by the problem regarding the technical environment. An additional period may be left for the administration entity for administering the server to clean up the service state of the server before it is shut down. The virtualized functions remaining thereon may be deleted or deactivated such that, when the server is restarted, they are not in an unstable state. The correspondence table is updated accordingly, such that the virtualized functions deleted from the server are no longer present in the table.

[FIG. 7] shows one example of the structure of a migration device.

The migration device 400 implements the migration method, various embodiments of which have just been described.

Such a device 400 may be implemented in a management entity for managing a communication infrastructure, such as a VIM entity or a management entity specific to parameters of the technical environment.

For example, the device 400 comprises a processing unit 430, equipped for example with a microprocessor μP, and driven by a computer program 410, stored in a memory 420 and implementing the determination method according to the invention. On initialization, the code instructions of the computer program 410 are for example loaded into a RAM memory, before being executed by the processor of the processing unit 430.

Such a device 400 comprises:
- a receiver 401, able to receive a notification message Notif comprising at least one item of data of a technical environment parameter relating to a first server,
- a determination module 402, able to determine an action to safeguard a virtualized function if the at least one item of data crosses a predefined threshold,
- a transmitter 403, able to transmit, to a management entity for managing the virtualized function, a message Migr to migrate the virtualized function to a second server.

The invention makes it possible to instantiate or to supplement a method for installing and migrating virtualized functions (VNFs) on a physical infrastructure by taking into account parameters inherent to the correct operation of the servers of the physical infrastructure, such as the temperature of the servers, the electric charge of the servers, the water or gas levels possibly impacting the correct operation of the servers, or even a risk of degradation of the servers. This list of parameters relating to the technical environment is not limited, and may be adapted depending on the location where the servers are deployed and the time when these servers are used. The term "server" that is used comprises, in equal regard, a physical server, a virtual machine or a container, depending on the type of deployment under consideration.

The parameters under consideration relating to the technical environment may be used with other parameters linked to storage, computing, network and availability resources that may be taken into account in order to migrate or not migrate a virtualized function on a server. The migration method may furthermore also take into account the specific nature of the virtualized function in order to migrate it or not migrate it and with what deadline, depending in particular on whether or not the virtualized function is critical for a service. The administration entity for administering the server may be a VIM device, for example, and the management device for managing the virtualized function may be for example a VNFM device. The technical environment parameter data may be transmitted to the administration entity directly or via an environment parameter controller responsible for managing the various parameters or even for correlating and interpreting various received parameters before transmitting them to the administration entity. The transmitted data may correspond to values, to states of a system, to variations, or to codes comprehensible to the administration entity, and these data may be transmitted securely, for example by encrypting these transmitted data.

The invention claimed is:

1. A migration method for migrating a virtualized function installed on a first server in a data center of a communication architecture, implemented in an administration entity for administering said first server, said administration entity being able to transmit, to a management entity for managing the virtualized function, data relating to installation of the virtualized function, the method comprising at least:
receiving a notification message comprising at least one item of data of a technical environment parameter relating to the first server;
determining an action to safeguard the virtualized function if the at least one item of data crosses a predefined threshold, the action to safeguard the virtualized function being determined by identifying the virtualized function on the impacted first server using a correspondence table comprising a list of virtualized functions installed on at least the first server; and
sending, to the management entity, a message to migrate the virtualized function to a second server selected as being not impacted by the at least one item of data of the technical environment parameter.

2. The migration method as claimed in claim 1, wherein the at least one item of data of a parameter of the technical environment relates to a supply of electric power to the first server.

3. The migration method as claimed in claim 1, wherein the at least one item of data of a technical environmental parameter relates to a cooling of the first server.

4. The migration method as claimed in claim 1, wherein the at least one item of data of a technical environment parameter relates to a water level in a room where the first server is located.

5. The migration method as claimed in claim 1, wherein determining a safeguarding action comprises triggering a migration deadline.

6. The migration method as claimed in claim 1, wherein the migration message comprises a migration duration to be complied with.

7. The migration method as claimed in claim 1, wherein the migration message comprises identification information relating to the virtualized function.

8. The migration method as claimed in claim 1, furthermore comprising receiving, from the management entity, an information message comprising an identifier of the second server to which the virtualized function has been migrated.

9. The migration method as claimed in claim 1, wherein the second server is selected on the basis of its location in the communication architecture.

10. The migration method as claimed in claim 1, furthermore comprising removing the first server from the correspondence table comprising the list of virtualized functions installed on at least the first server able to host a virtualized function following the reception of the notification message.

11. The migration method as claimed in claim 1, furthermore comprising shutting down the first server following the sending of the migration message to the management entity.

12. The migration method as claimed in claim 1, wherein the threshold is defined so that the virtualized function is migrated before the first server is out of service.

13. A device for migrating a virtualized function installed on a first server in a data center of a communication architecture, implemented in an administration entity for administering said first server, said administration entity being able to transmit, to a management entity for managing the virtualized function, data relating to installation of the virtualized function, the device comprising:
a receiver configured to receive at least one notification message comprising at least one item of data of a technical environment parameter relating to the first server;
a processing unit;
a non-transitory computer-readable medium comprising instructions stored thereon which when executed by the processing unit configure the processing unit to determine an action to safeguard the virtualized function if the at least one item of data crosses a predefined threshold, the action to safeguard the virtualized function being determined by identifying the virtualized function on the impacted first server using a correspondence table comprising a list of virtualized functions installed on at least the first server; and
a transmitter configured to transmit, to the management entity, a message to migrate the virtualized function to a second server selected as being not impacted by the at least one item of data of the technical environment parameter.

14. The device as claimed in claim 13, wherein the threshold is defined so that the virtualized function is migrated before the first server is out of service.

15. A non-transitory computer-readable recording medium comprising instructions of a computer program stored thereon, which when executed by a processing unit of an administration entity configure the administration entity to implement a method for migrating a virtualized function installed on a first server in a data center of a communication architecture, the administration entity administering said first server and being able to transmit, to a management entity for managing the virtualized function, data relating to installation of the virtualized function, the method comprising at least:
receiving a notification message comprising at least one item of data of a technical environment parameter relating to the first server;
determining an action to safeguard the virtualized function if the at least one item of data crosses a predefined threshold, the action to safeguard the virtualized function being determined by identifying the virtualized function on the impacted first server using a correspondence table comprising a list of virtualized functions installed on at least the first server; and sending, to the management entity, a message to migrate the virtualized function to a second server selected as being not impacted by the at least one item of data of the technical environment parameter.

16. The non-transitory computer-readable recording medium as claimed in claim 15, wherein the threshold is defined so that the virtualized function is migrated before the first server is out of service.

\* \* \* \* \*